US011876328B2

(12) United States Patent
Moncher et al.

(10) Patent No.: US 11,876,328 B2
(45) Date of Patent: Jan. 16, 2024

(54) ELECTRICAL PLUG WITH SPECIFIC PIN ARRANGEMENT AS WELL AS ELECTRICAL PLUG DEVICE

(71) Applicant: TE Connectivity Industrial GmbH, Niederwinkling (DE)

(72) Inventors: Philipp Moncher, Parsdorf (DE); Josef Achatz, Lalling (DE); Sebastian Achatz, Bernried (DE)

(73) Assignee: TE Connectivity Industrial GmbH, Niederwinkling (DE)

( * ) Notice: Subject to any disclaimer, the term of this patent is extended or adjusted under 35 U.S.C. 154(b) by 197 days.

(21) Appl. No.: 17/327,984

(22) Filed: May 24, 2021

(65) Prior Publication Data

US 2021/0281022 A1 Sep. 9, 2021

Related U.S. Application Data

(63) Continuation of application No. PCT/EP2019/082142, filed on Nov. 21, 2019.

(30) Foreign Application Priority Data

Nov. 22, 2018 (EP) .................................... 18207800

(51) Int. Cl.
*H01R 24/00* (2011.01)
*H01R 24/28* (2011.01)
*H01R 24/86* (2011.01)

(52) U.S. Cl.
CPC ............. *H01R 24/28* (2013.01); *H01R 24/86* (2013.01)

(58) Field of Classification Search
CPC ................................ H01R 24/28; H01R 24/86
(Continued)

(56) References Cited

U.S. PATENT DOCUMENTS 5,385,476 A * 1/1995 Jasper ................ H01R 13/6633 439/38
6,039,604 A * 3/2000 Tindall .................. H01R 24/86 439/934

(Continued)

FOREIGN PATENT DOCUMENTS

CN 201717468 U 1/2011
CN 105161938 A 12/2015

(Continued)

OTHER PUBLICATIONS

Japanese Office Action with English translation, Application No. 2021-528837, dated May 31, 2022, 19 pages.

(Continued)

*Primary Examiner* — Abdullah A Riyami
*Assistant Examiner* — Vladimir Imas
(74) *Attorney, Agent, or Firm* — Barley Snyder

(57) ABSTRACT

An electrical plug has a pin arrangement including a pair of electrical power transmitting contacts separate from one another and a plurality of electrical signal transmitting contacts separate from each other. A pin arrangement transverse axis extends through a central point of the pin arrangement. A distance extending parallel to the pin arrangement transverse axis between a pair of longitudinal axes of the electrical power transmitting contacts is less than or equal to 6.1 mm. A maximum distance extending parallel to the pin arrangement transverse axis between a plurality of longitudinal axes of the electrical signal transmitting contacts that are furthest from each other along a direction parallel to the pin arrangement transverse axis is less than or equal to 6 mm.

18 Claims, 8 Drawing Sheets

(58) Field of Classification Search
USPC .......................................................... 439/675
See application file for complete search history.

(56) References Cited

U.S. PATENT DOCUMENTS

| | | | | |
|---|---|---|---|---|
| 6,746,284 | B1 * | 6/2004 | Spink, Jr. | H01R 13/432 439/651 |
| 8,152,558 | B2 * | 4/2012 | Broeksteeg | H01R 13/65912 439/378 |
| 8,303,337 | B2 * | 11/2012 | Ballard | H01B 9/003 439/578 |
| 8,905,790 | B2 * | 12/2014 | Staudigel | H01R 13/50 439/607.05 |
| 9,634,427 | B2 * | 4/2017 | Lerner | H01R 13/5202 |
| 10,186,991 | B2 | 1/2019 | Schroedel et al. | |
| 10,424,879 | B2 * | 9/2019 | Vogel | H01R 13/514 |
| 2003/0022546 | A1 * | 1/2003 | Solomich | H01R 13/665 439/362 |
| 2010/0319956 | A1 | 12/2010 | Ballard et al. | |
| 2022/0190526 | A1 * | 6/2022 | He | H01R 24/86 |
| 2022/0302637 | A1 * | 9/2022 | Burrow | H01R 13/533 |

FOREIGN PATENT DOCUMENTS

| | | | |
|---|---|---|---|
| CN | 106952756 | A | 7/2017 |
| CN | 206658084 | U | 11/2017 |
| EP | 3171487 | A1 | 5/2017 |
| JP | S62184931 | A | 8/1987 |
| JP | H7106025 | A | 4/1995 |
| WO | 2010047715 | A1 | 4/2010 |
| WO | 2017008500 | A1 | 1/2017 |

OTHER PUBLICATIONS

Chinese Office Action with English translation, Application No. 201980076222.2, dated Jul. 29, 2022, 16 pages.
PCT Search Report and Written Opinion, dated Jan. 8, 2020, 16 pages.
Office Action from Japanese Patent Office dated Dec. 20, 2022, corresponding with Application No. 2021-528837 with English translation, 8 pages.
European Patent Office Communication, dated May 4, 2023, corresponding to Application No. 18 207 800.6-1201, 8 pages.

* cited by examiner

ELECTRICAL PLUG WITH SPECIFIC PIN ARRANGEMENT AS WELL AS ELECTRICAL PLUG DEVICE

CROSS-REFERENCE TO RELATED APPLICATIONS

This application is a continuation of PCT International Application No. PCT/EP2019/082142, filed on Nov. 21, 2019, which claims priority under 35 U.S.C. § 119 to European Patent Application No. 18207800.6, filed on Nov. 22, 2018.

FIELD OF THE INVENTION

The present invention relates to an electrical plug and, more particularly, to a pin arrangement of the electrical plug.

BACKGROUND

Electrical plugs are known in diverse configurations. It is also known that electric motors are contacted by electrical plugs. In this context, electrical energy can then be transferred from the motor and to the motor, respectively, via electrical power transmitting contacts, which are also referred to as power contacts. Signals different from energy signals, namely communication signals, such as for example control signals or data signals, can be transferred via electrical signal transmitting contacts.

In coupling multiple motors, it is also required that a sufficient and thus substantially consistent energy signal on the one hand and communication signals on the other hand are capable of being transferred via the corresponding chain. Thereby, high requirements are made of such electrical plugs, related to a high voltage stability and a high current carrying capability.

SUMMARY

An electrical plug has a pin arrangement including a pair of electrical power transmitting contacts separate from one another and a plurality of electrical signal transmitting contacts separate from each other. A pin arrangement transverse axis extends through a central point of the pin arrangement. A distance extending parallel to the pin arrangement transverse axis between a pair of longitudinal axes of the electrical power transmitting contacts is less than or equal to 6.1 mm. A maximum distance extending parallel to the pin arrangement transverse axis between a plurality of longitudinal axes of the electrical signal transmitting contacts that are furthest from each other along a direction parallel to the pin arrangement transverse axis is less than or equal to 6 mm.

BRIEF DESCRIPTION OF THE DRAWINGS

The invention will now be described by way of example with reference to the accompanying Figures, of which.

DETAILED DESCRIPTION OF THE EMBODIMENT(S)

Figure 1A:
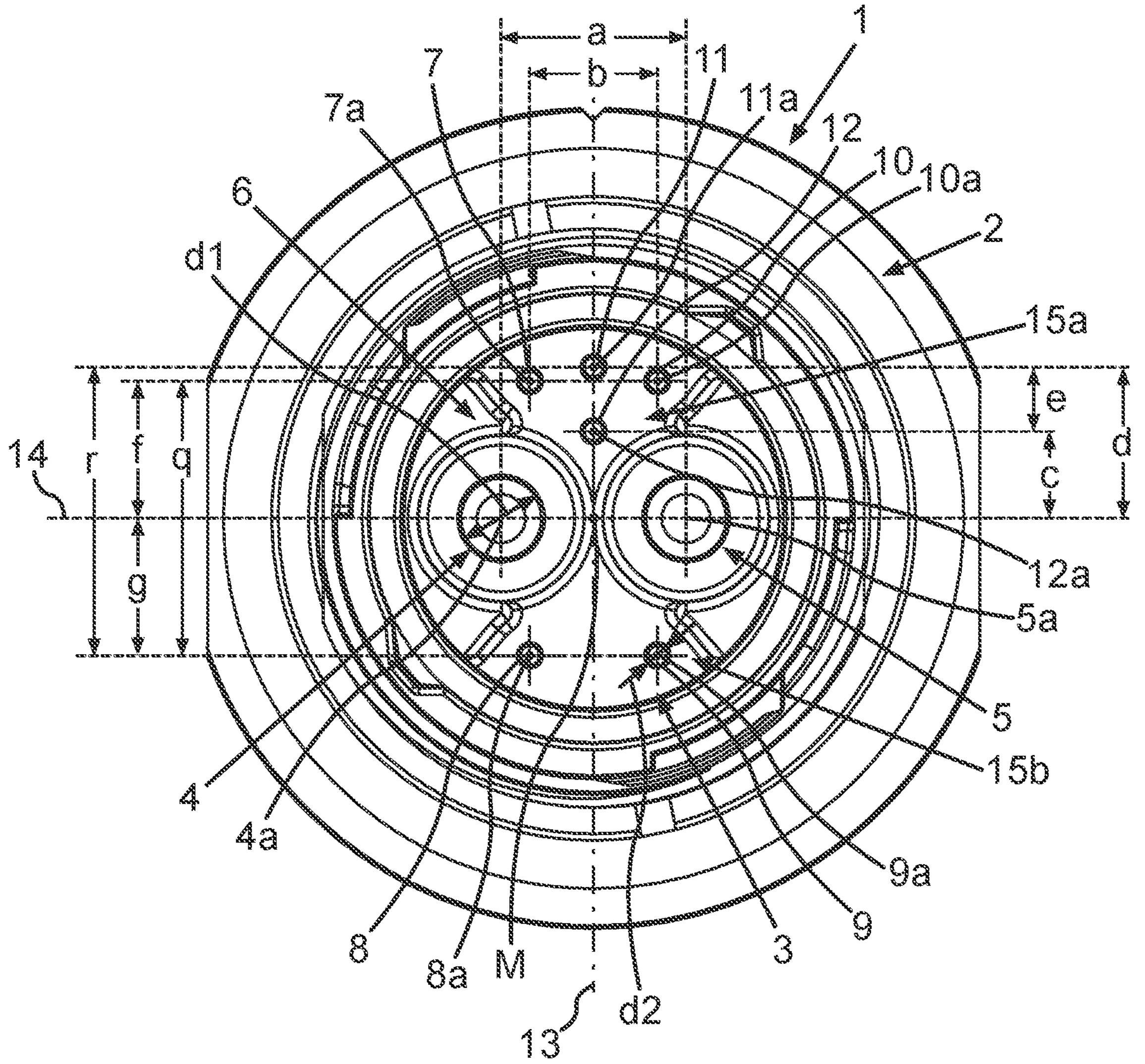
FIG. 1*a* is a front view of an electrical plug according to an embodiment.

Features of the invention are apparent from the claims, the figures, and the description of figures. The features and feature combinations described herein and/or shown in the figures are usable not only in the respectively specified combination, but also in other combinations or alone without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed that do not comprise all of the features of an originally formulated independent claim.

In the figures, identical or functionally identical elements are provided with the same reference characters. With indications of "top", "bottom", "front", "rear", "horizontal", "vertical", "depth direction", "width direction", "height direction", the positions and orientations given are with an observer then standing in front of the plug and looking in the direction of the plug. The position and orientation described is for ease of understanding and is not intended to limit the scope of the disclosure.

In FIG. 1*a*, an embodiment of an electrical plug 1 is shown. This electrical plug 1 is in an embodiment provided for use in a motor device, which comprises multiple separate motors. These motors can be arranged in a so-called daisy chain and are electrically connected via electrical plugs 1, in particular according to the example in FIG. 1*a*.

In FIG. 1*a*, the electrical plug 1 is shown with a tubular installation jack 2. This installation jack 2 represents an outer housing of the electrical plug 1 and is metallically formed. The functionality as the outer housing relates to the fact that a contact support 3 separate from the installation jack 2 is arranged in this installation jack 2. This contact support 3 is formed of plastic. It can be integrally or, in another embodiment, multi-part formed. In FIG. 1*a*, the electrical plug 1 is shown with a front view to the plug area or connection area.

In the embodiment shown in FIG. 1*a*, the electrical plug 1 comprises two, in an embodiment only two, separate, electrical power transmitting contacts 4 and 5. Here, the electrical power transmitting contacts 4 and 5 are formed as plug contacts or pin contacts. The electrical power transmitting contact 4, which can exemplarily be referred to as first electrical power transmitting contact, has a longitudinal axis 4*a* or contact axis, which is oriented perpendicular to the figure plane. Correspondingly, the further electrical power transmitting contact 5, which can exemplarily be referred to as second energy signal transmitting contact, has a longitudinal axis 5*a*, which is also oriented perpendicular to the figure plane. The longitudinal axes 4*a* and 5*a* are, in an embodiment, oriented parallel to a longitudinal axis (perpendicular to the figure plane) of the electrical plug 1. This longitudinal axis can extend through a central point M. This central point M also represents the central point of a pin arrangement 6. Generally the pin arrangement 6 could be named as pole format of the electrical poles of the electrical plug 1.

The electrical plug 1 comprises at least two separate electrical signal transmitting contacts, for example four separate electrical signal transmitting contacts, or six separate electrical signal transmitting contacts. In an embodiment, only six electrical signal transmitting contacts are formed. The electrical signal transmitting contacts represent electrical contacts separate from the electrical power transmitting contacts 4 and 5. The electrical signal transmitting contacts can also formed as plug contacts or pin contacts in the shown implementation. The pin arrangement 6 of the electrical plug 1 is formed by the arrangement of the electrical power transmitting contacts 4 and 5 and the electrical signal transmitting contacts.

In the embodiment shown in FIG. 1*a*, a first electrical signal transmitting contact 7 and a second electrical signal transmitting contact 8 are formed. Moreover, a further, third, electrical signal transmitting contact 9 is provided. Moreover, a further, fourth, electrical signal transmitting contact 10 is provided. Moreover, a further, fifth, electrical signal transmitting contact 11 is provided in the shown embodiment. A further, sixth, electrical signal transmitting contact 12 can also be formed. The exemplary numbering of the electrical signal transmitting contacts 7 to 12 from one to six is only to be understood as an aid for the further explanation. The numbering can also be diversely and also otherwise assigned. The electrical signal transmitting contacts 7 to 12 also each have longitudinal axes 7*a*, 8*a*, 9*a*, 10*a*, 11*a* and 12*a*. These longitudinal axes 7*a* to 12*a* are oriented perpendicular to the figure plane.

In the non-conclusive orientation exemplarily illustrated in FIG. 1*a*, the pin arrangement 6 has a pin arrangement height axis 13. Here, the pin arrangement height axis 13 is a vertical axis. The pin arrangement height axis 13 extends through the central point M and is arranged in the figure plane. The pin arrangement 6 has a pin arrangement transverse axis 14. The pin arrangement transverse axis 14 extends through the central point M. The pin arrangement transverse axis 14 is a horizontal axis in the here shown exemplary orientation of the electrical plug 1 and thus also of the pin arrangement 6. The pin arrangement transverse axis 14 is perpendicular to the pin arrangement height axis 13. The pin arrangement transverse axis 14 extends in the figure plane.

In an embodiment, a distance a between the longitudinal axes 4*a* and 5*a* of the electrical power transmitting contacts 4 and 5 shown in FIG. 1*a* is maximally 6.1 mm. As is apparent here, the two electrical power transmitting contacts 4 and 5 are arranged in series to each other and on the pin arrangement transverse axis 14. In other embodiments, this distance a is between 5.7 mm and 6 mm, for example 5.8 mm. The distance a is measured along the pin arrangement transverse axis 14.

In addition or instead, it can be provided that a maximum distance b between longitudinal axes of electrical signal transmitting contacts 7 to 12, shown in FIG. 1*a*, is 6 mm. This distance b is measured parallel to the pin arrangement transverse axis 14. This distance b in particular applies to a contact group 15, which is above the pin arrangement transverse axis 14 and thus is on an upper side of the pin arrangement transverse axis 14 in the representation shown in FIG. 1*a*. In another embodiment, the contact group 15 can be below the pin arrangement transverse axis 14. In particular, this distance b, which is maximally 6 mm, is formed between all of the longitudinal axis pairs of the longitudinal axes 7*a*, 10*a*, 11*a* and 12*a* of the here four electrical signal transmitting contacts 7, 10, 11 and 12. Thus, it can be 6 mm or less. In another embodiment, the distance b can be between 5.5 mm and 6 mm. This means that the distance b is valid both between the longitudinal axes 7*a* and 10*a*, as it is drawn here, and between the longitudinal axes 7*a* and 11*a*. This correspondingly also applies to all of the other combinations of the electrical signal transmitting contacts 7, 10, 11 and 12 in pairs with regard to their pair-wise distances b between the longitudinal axes 7*a*, 10*a*, 11*a* and 12*a* thereof. The distance b can be different from other longitudinal axis pairs between specific longitudinal axis pairs, but is always less than 6 mm. These distances can then also be measured non-parallel to the pin arrangement transverse axis 14 depending on the position of the electrical signal transmitting contacts of this contact group and thus depending on their position of the longitudinal axes.

In an embodiment, the largest distance b is drawn in FIG. 1*a* between the electrical signal transmitting contacts 7 and 10 of this contact group 15 positioned farthest apart; the outermost of the electrical signal transmitting contacts 7 and 10. Here, the other distances b between possible pair-wise electrical signal transmitting contacts 7, 10, 11 and 12 are smaller. Thus, it is allowed to arrange multiple electrical signal transmitting contacts very close to each other in such a direction, as it is preset by the pin arrangement transverse axis 14.

As is apparent in the representation in FIG. 1*a*, it is provided in the shown embodiment that two electrical signal transmitting contacts, here the electrical signal transmitting contacts 11 and 12, are arranged in series to each other on the pin arrangement height axis 13. The further electrical signal transmitting contacts 7 and 10 are arranged opposing, in particular symmetric to the pin arrangement height axis 13. In an embodiment, it is provided that the electrical signal transmitting contacts 7, 10 and 11 are arranged on an arc line.

In the embodiment shown in FIG. 1*a*, a distance c between the central point M and an electrical signal transmitting contact closest to the central point M, arranged on the pin arrangement height axis 13, which is here the electrical signal transmitting contact 12, is between 2.5 mm and 3 mm, between 2.6 mm and 2.8 mm, and for example 2.7 mm. In an embodiment, a distance d, which is measured along the pin arrangement height axis 13 and is measured between the central point M and the electrical signal transmitting contact arranged on the pin arrangement height axis 13, is between 4.5 mm and 5 mm, between 4.6 mm and 4.8 mm, and for example 4.7 mm. This distance d is measured along the pin arrangement height axis 13 between the central point M and the electrical signal transmitting contact of this contact group 15 farthest away along this pin arrangement height axis 13. Here, this is in the electrical signal transmitting contact 11.

In an embodiment, all of the electrical contacts of the pin arrangement 6 are arranged within a surface area, which is formed with a radius around the central point M of the pin arrangement 6, wherein the radius is less than 5 mm in an embodiment.

In an embodiment, a distance e shown in FIG. 1*a*, which is measured along the pin arrangement height axis 13 and is measured between the longitudinal axes 11*a* and 12*a* of the electrical signal transmitting contacts 11 and 12, is between 1.5 mm and 2.5 mm, between 1.9 mm and 2.1 mm, and for example 2 mm. The electrical power transmitting contacts 4 and 5 are arranged symmetric to the pin arrangement height axis 13. In particular, it is provided that in addition or instead the here four electrical signal transmitting contacts 7, 10, 11 and 12 of the contact group 15 are arranged mirror-symmetric to the pin arrangement height axis 13. Therein, two electrical signal transmitting contacts, here the electrical signal transmitting contacts 11 and 12, are in particular directly on the pin arrangement height axis 13.

In an embodiment, the electrical signal transmitting contacts 8 and 9 are arranged on one side with respect to the arrangement shown here, here the lower, side of the pin arrangement 6 with respect to the pin arrangement transverse axis 14. In an embodiment, two electrical signal transmitting contacts 8 and 9 are arranged mirror-symmetric to the pin arrangement height axis 13. A between the longitudinal axes 8*a* and 9*a* viewed in a direction parallel to the pin arrangement transverse axis 14 is the distance b. Therefore, it can have values as they were above explained. In an embodiment, the distance b between the longitudinal axes 8*a* and 9*a* is equal to the distance b as it was explained for the longitudinal axes 7*a* and 10*a*.

In the embodiment shown in FIG. 1*a*, the electrical signal transmitting contacts 7 and 8 are arranged mirror-symmetric to the electrical signal transmitting contacts 9 and 10 with respect to the pin arrangement height axis 13. In an embodiment, the electrical signal transmitting contacts 8 and 9, which are arranged on the lower side with respect to the pin arrangement transverse axis 14 in an exemplary orientation of the pin arrangement 6, are arranged mirror-symmetric to the electrical signal transmitting contacts 7 and 10 with respect to the pin arrangement transverse axis 14. In particular, the electrical signal transmitting contacts 7 and 10 represent the most exterior electrical signal transmitting contacts of the contact group 15. This outer position of these two electrical signal transmitting contacts 7 and 10 relates to the arrangement in a direction viewed parallel to the pin arrangement transverse axis 14.

In an embodiment, a distance f between the pin arrangement transverse axis 14 and the longitudinal axis 7*a* of the electrical signal transmitting contact 7 of the contact group 15 is maximally 5 mm and/or a distance f between the pin arrangement transverse axis 14 and the longitudinal axis 10*a* of the electrical signal transmitting contact 10 of the contact group 15 is maximally 5 mm. In an embodiment, this distance f is between 4.1 mm and 4.5 mm, and for example 4.3 mm.

A distance g between a longitudinal axis 8*a* of the electrical signal transmitting contact 8 is maximally 5 mm and/or a distance g between a longitudinal axis 9*a* of the electrical signal transmitting contact 9 is maximally 5 mm. In an embodiment, this distance g is between 4.1 mm and 4.5 mm, and for example 4.3 mm. In an embodiment, the distances f and g are identical. The distances f and g are measured perpendicular to the pin arrangement transverse axis 14. Thus, they are measured in the direction of the pin arrangement height axis 13 and parallel to the pin arrangement height axis 13, respectively.

A distance q is formed by the sum of the distances f and g, as it is also shown in FIG. 1*a*.

A distance r is measured between those electrical signal transmitting contacts, here the electrical signal transmitting contacts 8 and 11 or 9 and 11, which are each farthest spaced from this pin arrangement transverse axis 14 on opposing sides of the pin arrangement transverse axis 14, as shown in FIG. 1*a*. This distance r is measured perpendicular to the pin arrangement transverse axis 14. These here considered electrical signal transmitting contacts do not have to be on a straight line perpendicular to the pin arrangement transverse axis 14 for determining the distance q. The distance r is less than 9.2 mm, for example between 8.5 mm and 9 mm.

The distance d, which is viewed parallel to the pin arrangement height axis 13 and is measured between the pin arrangement transverse axis 14 and that longitudinal axis of an electrical signal transmitting contact, which is farthest away from the pin arrangement transverse axis 14 in this direction, is maximally 5 mm, and for example between 4.6 mm and 4.8 mm. In the embodiment shown here, the electrical signal transmitting contacts 7 and 8 are arranged along a straight line, which is oriented perpendicular to the pin arrangement transverse axis 14. In this context, the distances f and g are in particular identical. In this respect too, in electrical signal transmitting contacts, which are arranged on opposing sides to a pin arrangement transverse axis 14, is relatively small.

In an embodiment, the pin arrangement 6 is formed mirror-symmetric to the pin arrangement height axis 13. Thus, the electrical power transmitting contacts 4 and 5 as well as the electrical signal transmitting contacts 7, 8, 9 and 10 are in particular arranged mirror-symmetric to this pin arrangement height axis 13. In an embodiment, it is provided that the pin arrangement 6 is configured such that a connection cross-section between 0.30 $mm^2$ and 0.40 $mm^2$, in particular of 0.34 $mm^2$, is allowed to the electrical signal transmitting contacts 7, 8, 9, and 10.

In the embodiment shown in FIG. 1*a*, an electrical power transmitting contact 4, 5 has an outer diameter d1, which is between 2 mm and 4 mm, and for example between 2.4 mm and 3.6 mm. In an embodiment, the outer diameters d1 of the electrical power transmitting contacts 4 and 5 are identical. In particular, it is provided that an outer diameter d2 of an electrical signal transmitting contact 7, 8, 9, 10, 11, 12 is between 0.5 mm and 1 mm, or between 0.6 mm and 1 mm. In an embodiment, the outer diameters d2 of all of the electrical signal transmitting contacts 7 to 12 are identical. In an embodiment, the pin arrangement 6 is formed such that a line with a connection cross-section between 5.5 $mm^2$ and 6.5 $mm^2$, in particular of 6 $mm^2$, can be connected to the electrical power transmitting contacts 4 and 5.

Figure 1B:
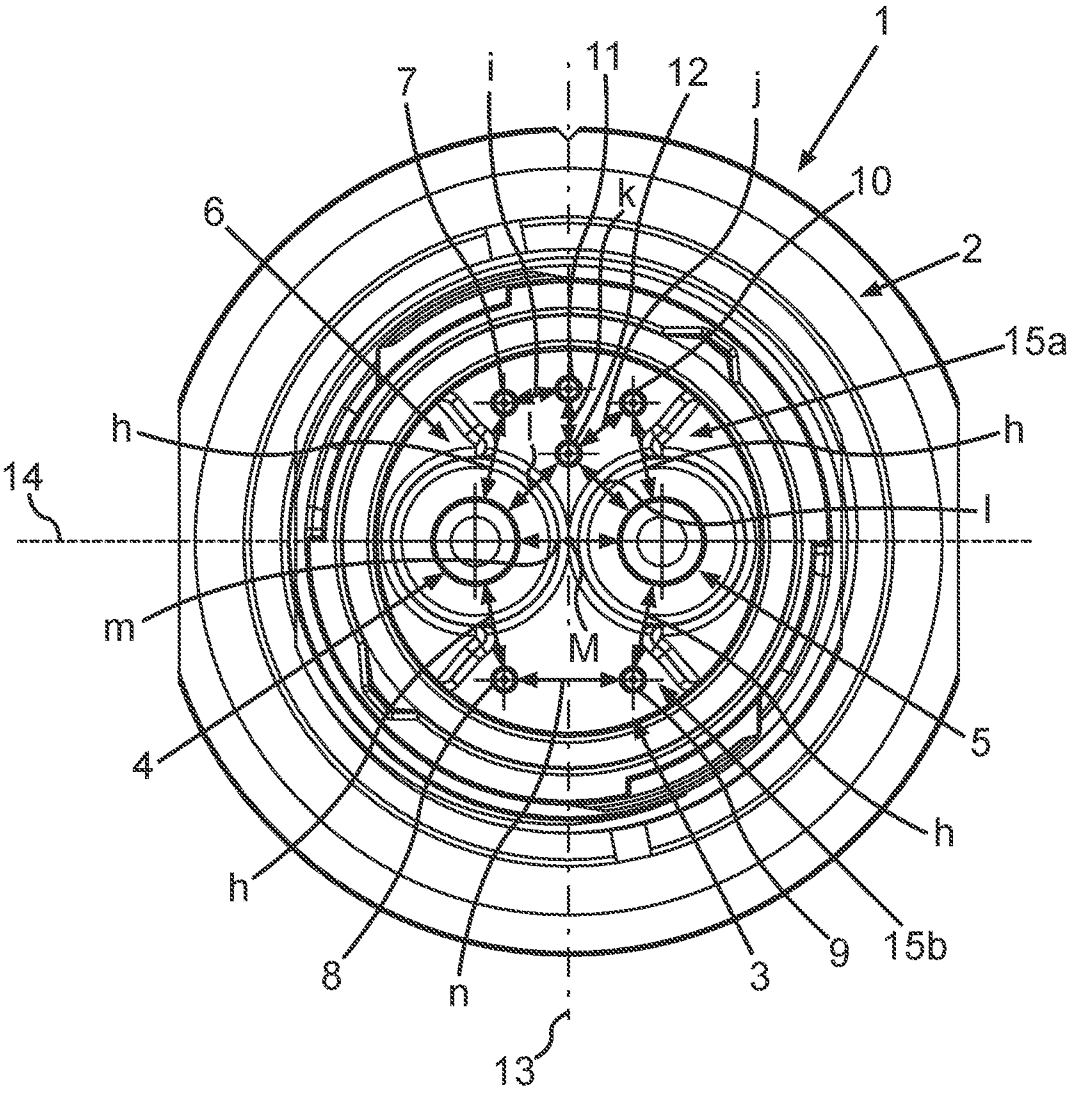
FIG. 1*b* is another front view of the electrical plug of FIG. 1*a;*

In FIG. 1*b*, the electrical plug 1 is shown according to the representation in FIG. 1*a*. In contrast to FIG. 1*a*, exemplary distances between outer sides of the electrical contacts 4, 5, 7, 8, 9, 10, 11, 12 are represented in FIG. 1*b*. Thus, in contrast to the representation in Figure la, there are not shown distances between longitudinal axes and thus centers of the electrical contacts 4, 5, 7, 8, 9, 10, 11, 12, but between the jacket walls of these pin contacts in the shown embodiment.

The distances between these outer sides are measured on a straight line, but which respectively extends through the longitudinal axes of the respectively considered electrical contacts 4, 5, 7, 8, 9, 10, 11, 12. In this context, a distance h can be formed between an energy signal transmitting contact 4 and a closest electrical signal transmitting contact 7 of the contact group 15 most exterior viewed in the direction of the pin arrangement transverse axis 14. This distance h can be between 1.3 mm and 2.4 mm in an embodiment.

A further exemplary distance i, which is drawn in FIG. 1*b*, is measured between two adjacent electrical signal transmitting contacts 7 and 11 or between the electrical signal transmitting contacts 10 and 11. In this context, a distance i is thus measured between the electrical signal transmitting contacts of the contact group 15 arranged on an arc path. In an embodiment, this distance i can be between 0.5 mm and 0.7 mm.

A distance j is measured between an electrical signal transmitting contact 7 or 10, which is not arranged on the pin arrangement height axis 13 and belongs to the contact group 15, and measured between a further electrical signal transmitting contact 12 located on the pin arrangement height axis 13. This further electrical signal transmitting contact 12 is the electrical signal transmitting contact closest to the central point M of those electrical signal transmitting contacts 11 and 12, which are arranged on the pin arrangement height axis 13. This distance j can be between 1.0 mm and 1.2 mm.

In the contact group 15, each distance i, j between a pair of electrical signal transmitting contacts 7 to 12 of the contact group 15, measured between outer walls of the electrical signal transmitting contacts 7 to 12, is between 0.4 mm and 1.3 mm, or between 0.5 mm and 1.2 mm.

A further distance k between outer sides of electrical signal transmitting contacts 11 and 12 of the contact group 15 is shown in FIG. 1*b*. This in particular relates to the distance along the pin arrangement height axis 13 between the two electrical signal transmitting contacts 11 and 12, which are arranged on the pin arrangement height axis 13. In an embodiment, this distance k is between 0.5 mm and 0.7 mm.

In an embodiment, a further distance 1 between outer sides of the electrical power transmitting contact 4 and that electrical signal transmitting contact 12 is shown, which is on the pin arrangement height axis 13 and which is the electrical signal transmitting contact closest to the central point M of those electrical signal transmitting contacts 11 and 12, which are arranged on the pin arrangement height axis 13. The same applies with respect to a distance 1 between the energy signal transmitting contact 5 and this electrical signal transmitting contact 12. In an embodiment, this distance 1 is between 0.9 mm and 2.0 mm.

In an embodiment, a distance m between outer sides of the electrical power transmitting contacts 4 and 5 is between 0.9 mm and 3.3 mm. This distance m is measured on the pin arrangement transverse axis 14.

Moreover, a distance n between outer sides of the electrical signal transmitting contacts 8 and 9, which are associated with a second contact group 15*b*, is between 2.4 mm and 2.6 mm in an exemplary embodiment. This distance n is measured parallel to the pin arrangement transverse axis 14. The second contact group 15*b* relates to the electrical signal transmitting contacts, which are arranged on the lower side of the pin arrangement 6 with respect to the pin arrangement transverse axis 14. In the embodiment, they are the electrical signal transmitting contacts 8 and 9.

As discussed above in the embodiment in FIGS. 1*a* and 1*b*, the contacts 4, 5, 7, 8, 9, 10, 11, 12 are contact pins. In the shown embodiment they are male contacts.

Figure 1C:
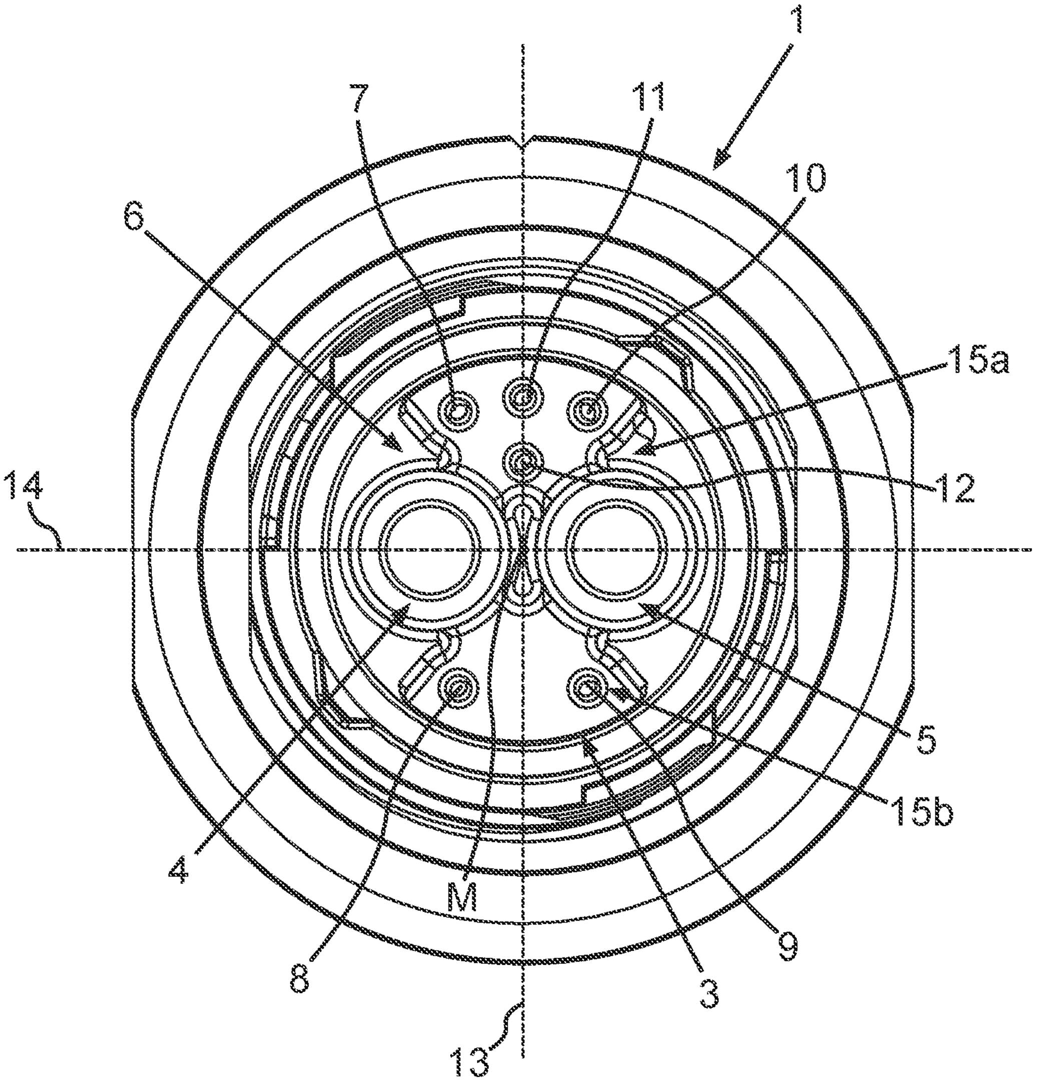
FIG. 1*c* is a front view of an electrical mating plug according to an embodiment.

In FIG. 1*c*, a representation of the electrical plug 1 is shown, which shows an electrical mating plug to the representations in FIGS. 1*a* and 1*b*. This means that the electrical contacts 4, 5 as well as 7 to 12 are not formed as electrical pin contacts, but as channel-like receptacles, such as blind holes, in the shown embodiment. The pin contacts as they were explained in FIGS. 1*a* and 1*b* can then be plugged into them, in particular plugged in an accurately fitting manner. In particular, the explanations to FIGS. 1*a* and 1*b* to the respective arrangements, numbers of electrical contacts and distances also apply to this implementation in FIG. 1*c*. For the sake of clarity, the part specifications, as they were represented to FIGS. 1*a* and 1*b*, are not shown in FIG. 1*c*, but correspondingly apply here. In FIG. 1*c* the contacts 4, 5, 7, 8, 9, 10, 11, 12 are contact receptacles. In the shown embodiment they are female contacts.

Figure 2:
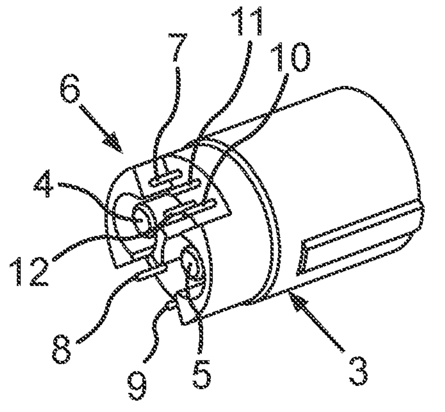
FIG. 2 is a perspective view of the electrical plug of FIG. 1*a;*

In FIG. 2, the contact support 3 according to the embodiment in FIGS. 1*a* and 1*b* is shown in a perspective representation. The pin arrangement 6 with the electrical power transmitting contacts 4 and 5 as well as the electrical signal transmitting contacts 7, 8, 9, 10, 11 and 12 is apparent. The electrical signal contacts are, in an embodiment, designed to transmit communication signals, for example data signals or control signals. Therefore they could be named as communication signal transmitting contacts. Signals different from energy signals, namely communication signals, such as for example control signals or data signals, can be transferred via the electrical signal transmitting contacts. Energy signals are transferred via the electrical power transmitting contacts 4 and 5.

Figure 3:
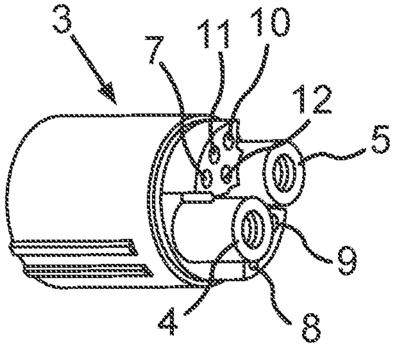
FIG. 3 is a perspective view of the electrical mating plug of FIG. 1*c;*

In FIG. 3, the configuration according to FIG. 1*c* is shown, wherein only the contact support 3 is shown here too and the installation jack is not illustrated.

Figure 4:
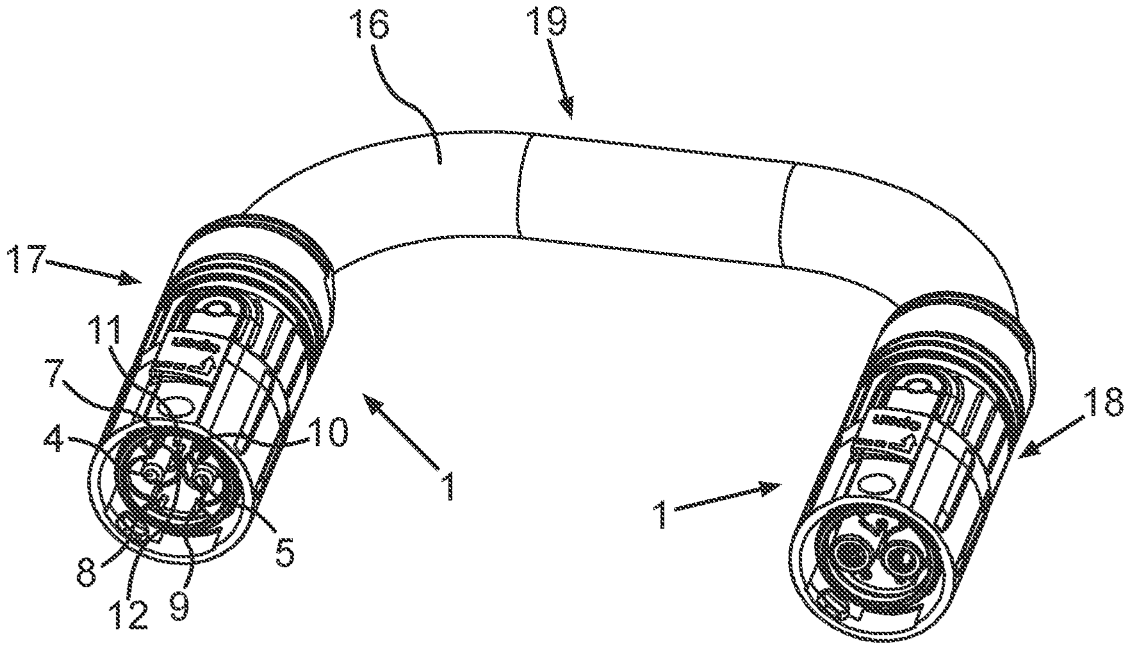
FIG. 4 is a perspective view of an electrical plug device according to an embodiment.

In FIG. 4, a specific embodiment of an electrical plug device 19 is shown in a perspective representation. In an embodiment the electrical plug device 19 could be an electrical motor device connector. It comprises a cable 16. Plug couplings 17 and 18 are formed at the cable 16 on the end side. Here, the plug coupling 17 is designed as an electrical plug 1 comprising contacts 4, 5, 7, 8, 9, 10, 11, 12 which are designed as pin contacts. Thus, it is formed with pin contacts with respect to the electrical power transmitting contacts 4, 5 and the electrical signal transmitting contacts 7 to 12. The plug coupling 18 is designed as an electrical plug 1 which is an electrical counter plug comprising contacts 4, 5, 7, 8, 9, 10, 11, 12 which are designed as channel-like receptacles and not as pin contacts. The plug device 19, which comprises the cable 16 and the two end-side electrical plugs 1, can be provided for electrically connecting two motors of a motor device in an embodiment. In a further embodiment, the electrical plugs 1 are identically formed and configured according to the configuration in FIG. 1*a* and FIG. 1*b*.

Figure 5:
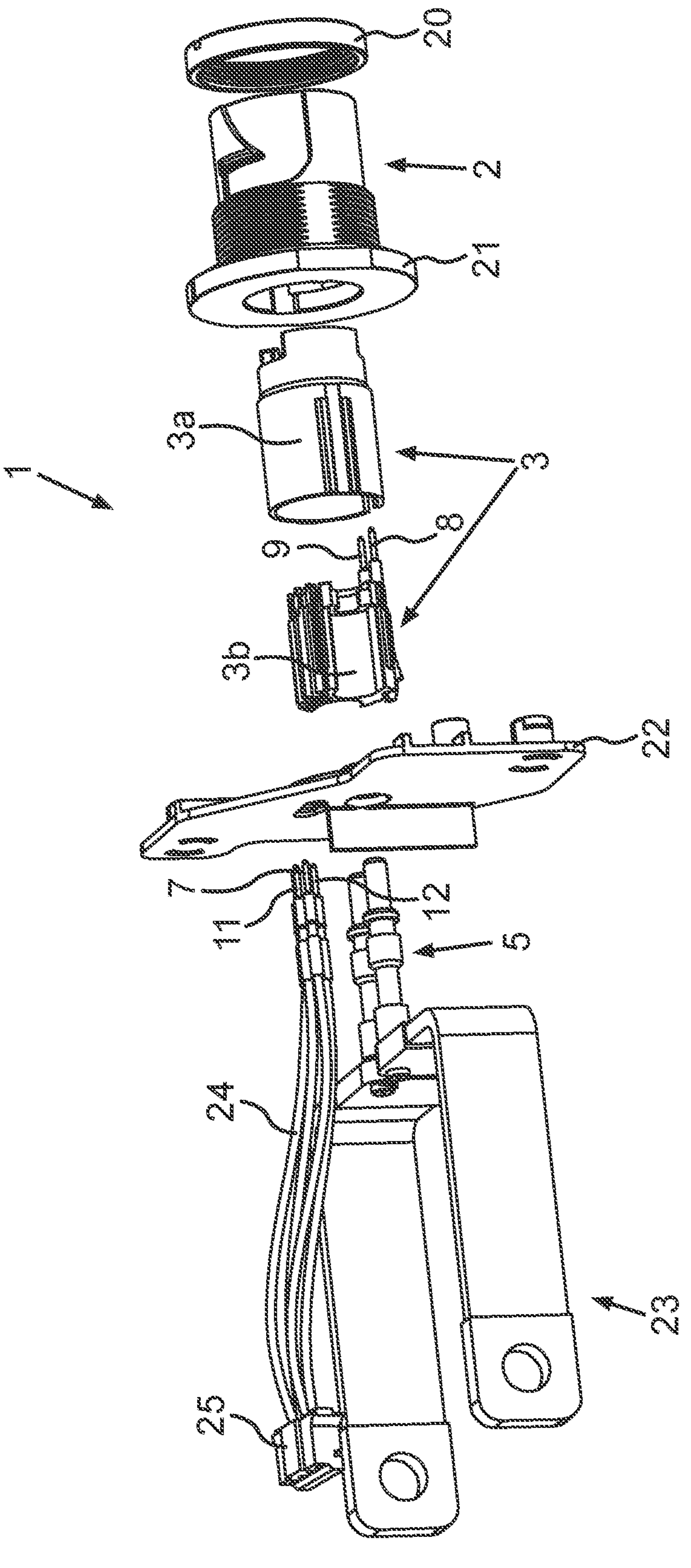
FIG. 5 is an exploded perspective view of an electrical plug according to another embodiment.

In FIG. 5, a further embodiment of an electrical plug 1 is shown, wherein an exploded representation is shown here. Here, the electrical plug 1 again comprises the installation jack 2 and the contact support 3. Here, the contact support 3 is multi-part formed and comprises a support sleeve 3*a* and a pin support 3*b*. The pin support 3*b* is insertable into the sleeve 3*a*. Moreover, the electrical plug 1 comprises a cap nut 20, which can be screwed to an external thread of the tubular installation jack 2. Thereby, a retaining element, for example a plate, can be inserted between the cap nut 20 and the end-side flange 21 of the integral installation housing 2, at which the installation jack 2 and thus the entire electrical plug 1 can then be installed by this screw connection.

In the embodiment shown in FIG. 5, the electrical plug 1 comprises an electrically insulating insulator plate 22. The installation jack 2 is fixed, in particular non-destructively detachably fixed, to this insulator plate 22. For example, this can be provided by pressing. In other embodiments, the coupling device can for example be a plug connection or another quick-lock connection such as a bayonet joint or the like. In this context, the electrical power transmitting contacts 4, 5 can for example in particular be passed through holes in the insulator plate 22 and for example be fixed therein by a press fit. In that the electrical power transmitting contacts 4 and 5 are also fixedly arranged at the contact support 3, in particular the pin support 3*b*, a mechanically fixed attachment of the contact support 3 to the insulator plate 22 is then again allowed here too. The electrical power transmitting contacts 4 and 5 are electrically connected to a busbar 23, which can be a flat ribbon conductor. In an embodiment, the busbar 23 has a U-shaped final shape. The electrical signal transmitting contacts are connected to a contacting plug 25 via lines 24.

Figure 6:
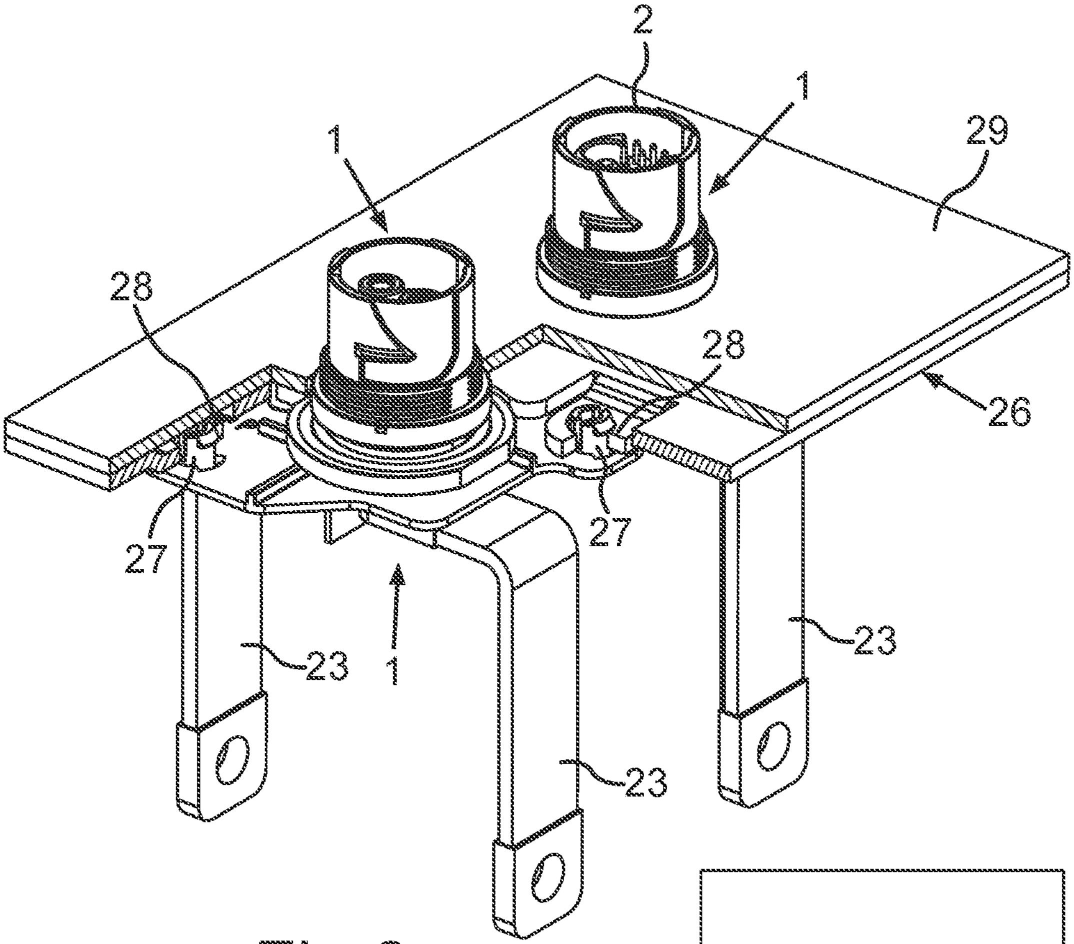
FIG. 6 is a perspective view of an electrical plug device according to another embodiment with a pair of electrical plugs.

In FIG. 6, an embodiment of an electrical plug device 19 is shown in a perspective representation, which here comprises two electrical plugs 1. Each of these electrical plugs 1 is formed according to the configuration in FIG. 5. This means that each electrical plug 1 comprises an own separate insulator plate 22. This plug device 19 moreover comprises a plate-like housing support 26. The individual plugs 1 are non-destructively detachably fixed, in particular locked, to this plate-like housing support 26. Thereto, it is provided in an embodiment that the insulator plates 22 comprise locking elements 27, in particular each insulator plate 22 comprises two locking elements 27, which are locked in locking receptacles 28 of this separate plate-like housing support 26. The same is the case in the further separate electrical plug 1 in FIG. 6. Moreover, the plug device 19 comprises an outer housing 29, by which the plate-like housing support 26 is covered. In the shown example, the front electrical plug 1 is formed as an electrical mating plug. In particular, the designation plug and mating plug relates to the type of the electrical contacts, namely if they are pin contacts or channel-like receptacles. However, a mating plug individually considered is basically also to be understood as an electrical plug.

Figure 7:
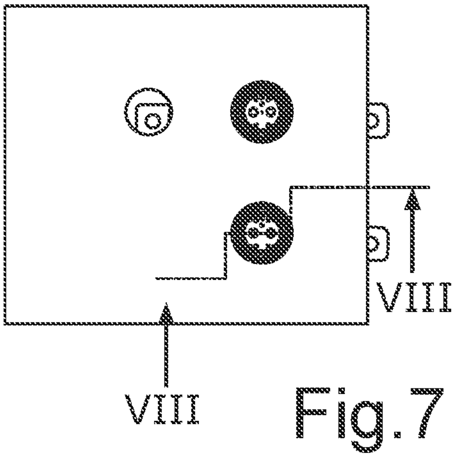
FIG. 7 is a plan view of the electrical plug device of FIG. 6.

In FIG. 7, the representation according to FIG. 6 is shown in plan view. Here, the busbars 23 are shown still in the undeformed state and not yet illustrated in the U-shape shown in FIG. 6.

Figure 8:
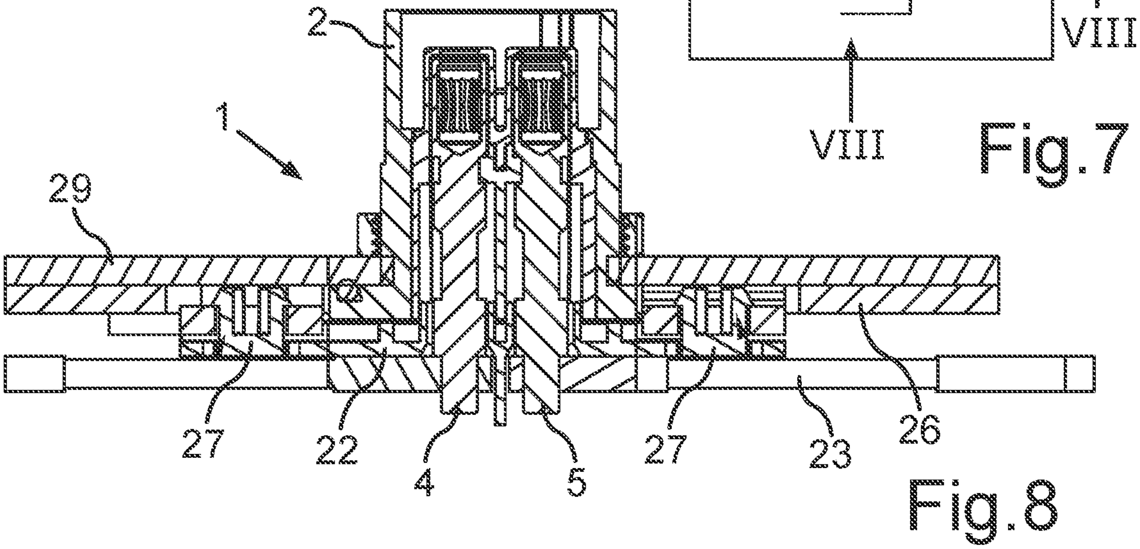
FIG. 8 is a sectional side view of the electrical plug device, taken along line VIII-VIII of FIG. 7.

In FIG. 8, a configuration of the plug device 19 is shown in a sectional representation along the sectional line VIII-VIII in FIG. 7. In this embodiment according to FIG. 6 to FIG. 8, it is provided that the front electrical plug 1 (as a mating plug) in FIG. 6 is formed according to the configuration in FIG. 1*c* and the rear electrical plug 1 is formed according to the configuration in FIGS. 1*a* and 1*b*.

Figure 9:
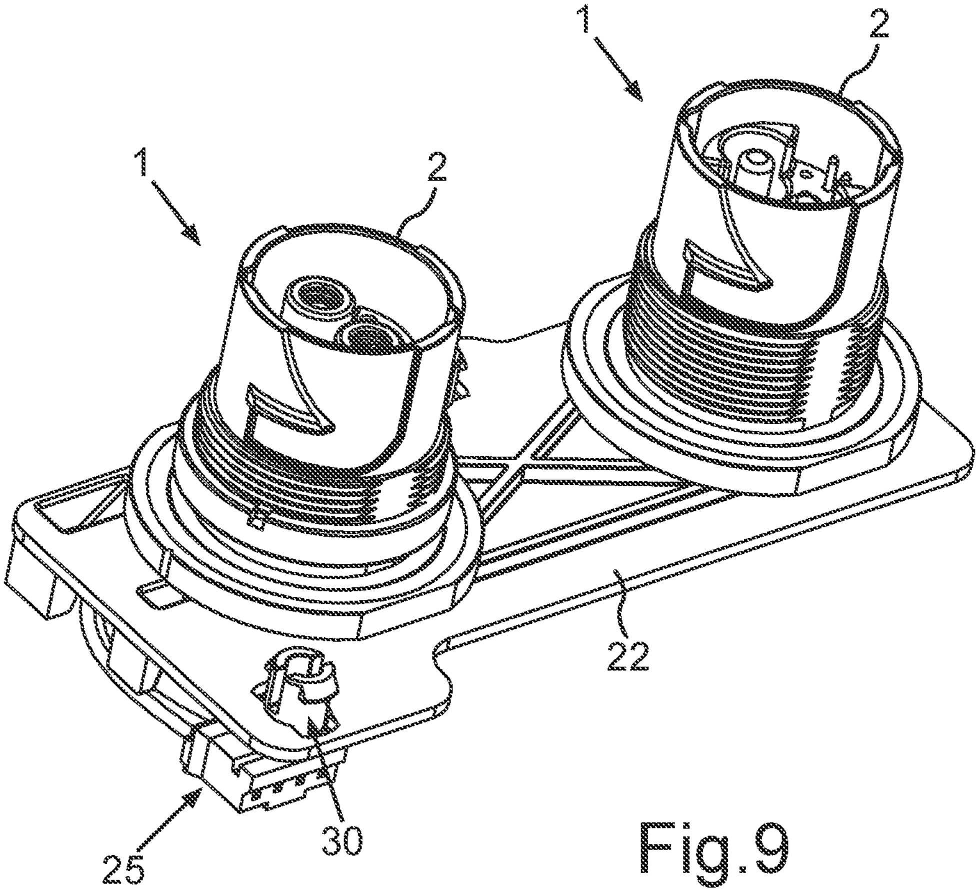
FIG. 9 is a perspective view of an electrical plug device according to another embodiment.
Figure 10:
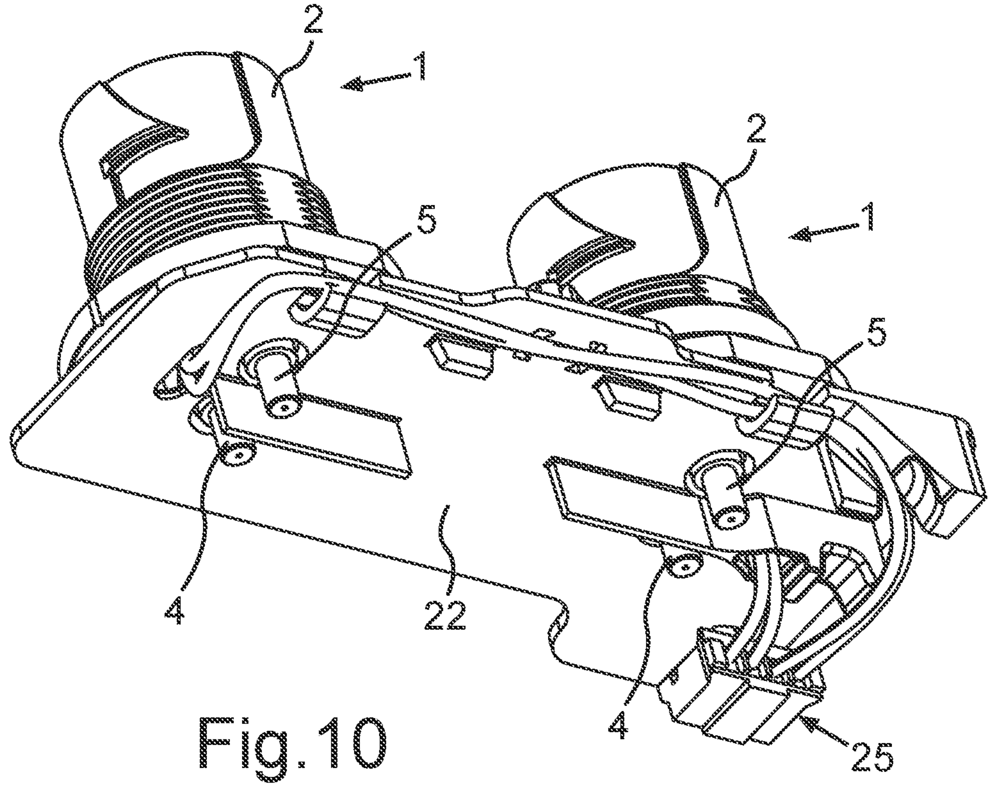
FIG. 10 is another perspective view of the electrical plug device of FIG. 9.

In FIG. 9, a further embodiment of an electrical plug device 19 is shown, in which at least two electrical plugs 1 are present. In particular, they are configured according to the configuration in FIGS. 6 to 8 with regard to their installation jack 2, the contact support 3 and the pin arrangement 6. Here too, the front electrical plug 1 is in particular formed according to the configuration in FIG. 1*c* and the rear electrical plug 1 is configured according to the implementations in FIGS. 1*a* and 1*b*. In this implementation, it is provided that these two electrical plugs 1 comprise a common insulator plate 22, which is in particular integrally formed. Here, the contacting plug 25 is locked to the insulator plate 22 itself by a locking connection 30. In FIG. 10, the representation according to FIG. 9 is shown in a perspective different therefrom.

Figure 11:
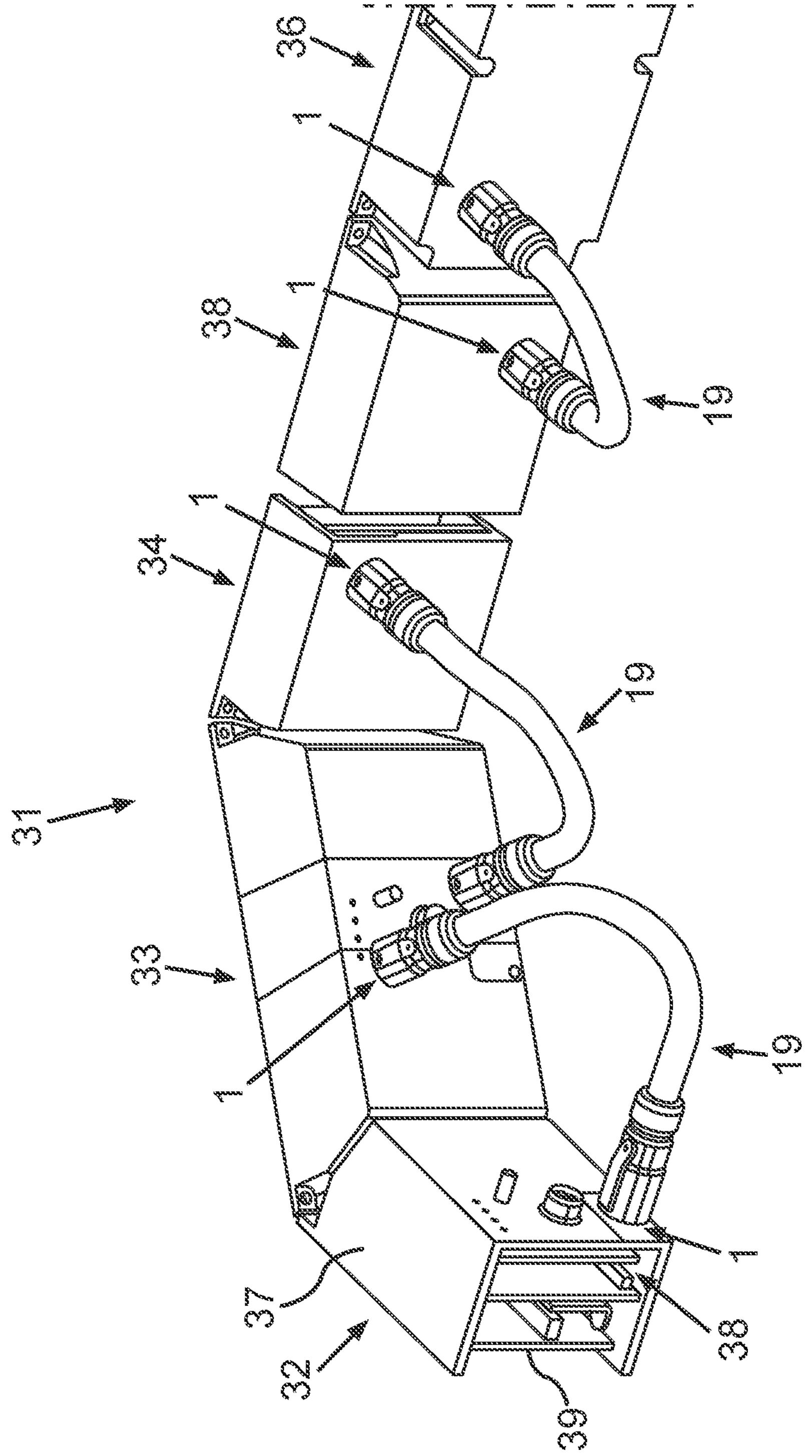
FIG. 11 is a perspective view of a motor device according to an embodiment.

In FIG. 11, a motor device 31 is shown in an exemplary perspective representation. This motor device 31 can be provided for a transport system. The motor device 31 comprises multiple separate motors 32, 33, 34, 35 and 36, which can be linear motors in an embodiment. They are connected in series to each other and represent a daisy chain. The motor 32 comprises an outer housing 37. Furthermore, it comprises an interior circuit board brace separate from the housing 37, which supports at least one circuit board 39. The other motors 33 to 36 are also correspondingly formed. The shown number of motors 32 to 37 is only exemplary. More or less motors can also be provided. Moreover, exemplary plug devices 19 are provided, by which the individual motors 32 to 36 are electrically connected to each other. In the embodiment, these plug devices 19 are formed according to the representation in FIG. 4. The motors 32 to 36 each comprise a built-in electrical plug 1, such that a plug device 19 separate therefrom can be mechanically and electrically coupled thereto. The motors 32 to 36 are in particular linear motors.

By this arrangement of the at least four separate electrical contacts of the electrical plug 1, a very individual pin arrangement 6 can be provided. With respect to the arrangement of the electrical power transmitting contacts on the one hand and the electrical signal transmitting contacts on the other hand, it is configured such that the electrical plug 1 is compactly formed, in particular a compact pin arrangement 6 is provided, yet is suitable for the above mentioned requirements to the usability for connection to an electric motor or a motor device 31 with multiple motors.

By the configuration of the electrical plug 1, a high current carrying capability is also achieved, which is advantageous especially in use in daisy chains, in particular in the mentioned transport systems. By the configuration of the pin assignment, an electrical plug 1 is in particular also allowed, in which currents of up to 60 A can be transferred. An undesired voltage drop in the daisy chain can also be counteracted by the electrical plug 1 with the specific pin assignment 6.

What is claimed is:

1. An electrical plug, comprising:

a pin arrangement including a pair of electrical power transmitting contacts separate from one another and a plurality of electrical signal transmitting contacts separate from each other, a pin arrangement transverse axis extends through a central point of the pin arrangement, the electrical power transmitting contacts are aligned with each other along the pin arrangement transverse axis, a distance extending parallel to the pin arrangement transverse axis between a pair of longitudinal axes of the electrical power transmitting contacts is less than or equal to 6.1 mm, a maximum distance extending parallel to the pin arrangement transverse axis between a plurality of longitudinal axes of the electrical signal transmitting contacts that are furthest from each other along a direction parallel to the pin arrangement transverse axis is less than or equal to 6 mm.

2. The electrical plug of claim 1, wherein a maximum distance extending parallel to the pin arrangement transverse axis between the longitudinal axes of at least two outermost electrical signal transmitting contacts of the electrical signal transmitting contacts along the direction parallel to the pin arrangement transverse axis is between 5.5 mm and 6 mm.

3. The electrical plug of claim 1, wherein a pin arrangement height axis extends through the central point of the pin arrangement, a distance parallel to the pin arrangement height axis between the pin arrangement transverse axis and one of the electrical signal transmitting contacts furthest from the pin arrangement transverse axis along a direction of the pin arrangement height axis is less than or equal to 5 mm.

4. The electrical plug of claim 1, wherein a distance perpendicular to the pin arrangement transverse axis between the longitudinal axes of electrical signal transmitting contacts that are farthest spaced from the pin arrangement transverse axis and arranged on opposing sides of the pin arrangement transverse axis is less than or equal to 9 mm.

5. The electrical plug of claim 1, wherein at least two of the electrical signal transmitting contacts are arranged in series to each other along a straight line perpendicular to the pin arrangement transverse axis and are arranged at a same distance to the pin arrangement transverse axis on opposing sides of the pin arrangement transverse axis.

6. The electrical plug of claim 1, wherein at least two of the electrical signal transmitting contacts are arranged in series to each other along a pin arrangement height axis extending through the central point perpendicular to the pin arrangement transverse axis and have a distance of less than or equal to 5.5 mm to each other.

7. The electrical plug of claim 1, wherein the electrical power transmitting contacts and/or the electrical signal transmitting contacts are arranged mirror-symmetric to a pin arrangement height axis extending through the central point perpendicular to the pin arrangement transverse axis.

8. The electrical plug of claim 1, wherein the pin arrangement has at least four electrical signal transmitting contacts.

9. The electrical plug of claim 1, wherein at least two of the electrical signal transmitting contacts are arranged above the pin arrangement transverse axis and at least two of the electrical signals contacts are arranged below the pin arrangement transverse axis.

10. The electrical plug of claim 1, wherein at least two of the electrical signal transmitting contacts are arranged on a first side of a pin arrangement height axis extending through the central point, at least two of the electrical signal transmitting contacts are arranged on an opposite side of the pin arrangement height axis, and/or at least two of the electrical signal transmitting contacts are arranged on the pin arrangement height axis.

11. The electrical plug of claim 1, wherein an outer diameter of one of the electrical power transmitting contacts is between 2 mm and 4 mm.

12. The electrical plug of claim 1, wherein an outer diameter of one of the electrical signal transmitting contacts is between 0.5 mm and 1 mm.

13. The electrical plug of claim 1, wherein at least three of the electrical signal transmitting contacts are arranged in a contact group on one side of the pin arrangement transverse axis, a distance between each pair of the electrical signal transmitting contacts of the contact group, measured between an outer wall of each of the electrical signal transmitting contacts, is between 0.4 mm and 1.3 mm.

14. The electrical plug of claim 1, further comprising a tubular installation jack as an outer housing in which the electrical power transmitting contacts and the electrical signal transmitting contacts are received, the tubular installation jack is formed for coupling to a mating plug.

15. An electrical plug, comprising:

a pin arrangement including a pair of electrical power transmitting contacts separate from one another and a plurality of electrical signal transmitting contacts separate from each other, a pin arrangement transverse axis extends through a central point of the pin arrangement, the electrical power transmitting contacts are aligned with each other along the pin arrangement transverse axis, a pin arrangement height axis extends through the central point of the pin arrangement and perpendicular to the pin arrangement transverse axis, a distance parallel to the pin arrangement height axis between the pin arrangement transverse axis and one of the electrical signal transmitting contacts furthest from the pin arrangement transverse axis along a direction of the pin arrangement height axis is less than or equal to 5 mm.

16. An electrical plug, comprising:

a pin arrangement including a pair of electrical power transmitting contacts separate from one another and a plurality of electrical signal transmitting contacts separate from each other, a pin arrangement transverse axis extends through a central point of the pin arrangement, the electrical power transmitting contacts are aligned with each other along the pin arrangement transverse axis, a distance perpendicular to the pin arrangement transverse axis between a pair of longitudinal axes of electrical signal transmitting contacts that are farthest spaced from the pin arrangement transverse axis and arranged on opposing sides of the pin arrangement transverse axis is less than or equal to 9 mm.

17. An electrical plug device, comprising:

a pair of electrical plugs each having a pin arrangement including a pair of electrical power transmitting contacts separate from one another and a plurality of electrical signal transmitting contacts separate from each other, a pin arrangement transverse axis extends through a central point of the pin arrangement, a distance extending parallel to the pin arrangement transverse axis between a pair of longitudinal axes of the electrical power transmitting contacts is less than or equal to 6.1 mm, a maximum distance extending parallel to the pin arrangement transverse axis between a plurality of longitudinal axes of the electrical signal transmitting contacts that are furthest from each other along a direction parallel to the pin arrangement transverse axis is less than or equal to 6 mm;

a pair of installation jacks that are each an outer housing for one of the electrical plugs in which the electrical power transmitting contacts and the electrical signal transmitting contacts are received; and an electrically insulating insulator plate on which the installation jacks are installed, the electrically insulating insulator plate is non-destructively detachably fixed to a plate-like housing support of the electrical plug device separate from the electrically insulating insulator plate.

18. The electrical plug device of claim 17, wherein the electrically insulating insulator plate is one of a pair of electrically insulating insulator plates and each installation jack is installed on a separate one of the electrically insulating insulator plates.

* * * * *